(12) United States Patent
Johnson et al.

(10) Patent No.: US 7,895,841 B2
(45) Date of Patent: Mar. 1, 2011

(54) METHOD AND APPARATUS TO FACILITATE REDUCING $NO_x$ EMISSIONS IN TURBINE ENGINES

(75) Inventors: Arthur Wesley Johnson, Cincinnati, OH (US); Richard W. Stickles, Loveland, OH (US); Willard J. Dodds, McMinnville, OR (US); David L. Burrus, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 812 days.

(21) Appl. No.: 11/486,757

(22) Filed: Jul. 14, 2006

(65) Prior Publication Data

US 2008/0010991 A1 Jan. 17, 2008

(51) Int. Cl.
*F03C 1/00* (2006.01)
*F02G 3/00* (2006.01)

(52) U.S. Cl. .......... 60/752; 60/753; 60/754; 60/755; 60/756; 60/759; 60/760

(58) Field of Classification Search ............ 60/752–760
See application file for complete search history.

(56) References Cited

U.S. PATENT DOCUMENTS

| | | | |
|---|---|---|---|
| 4,389,848 A | 6/1983 | Markowski et al. | |
| 4,944,149 A | 7/1990 | Kuwata | |
| 5,685,706 A | 11/1997 | Hersh et al. | |
| 6,048,510 A | 4/2000 | Zauderer | |
| 6,101,814 A * | 8/2000 | Hoke et al. | 60/752 |
| 6,192,689 B1 | 2/2001 | Feitelberg et al. | |
| 6,260,359 B1 * | 7/2001 | Monty et al. | 60/752 |
| 6,415,745 B1 | 7/2002 | Hellen et al. | |
| 6,427,446 B1 * | 8/2002 | Kraft et al. | 60/737 |
| 6,453,830 B1 | 9/2002 | Zauderer | |
| 6,513,331 B1 | 2/2003 | Brown et al. | |
| 6,543,233 B2 | 4/2003 | Young et al. | |
| 6,553,767 B2 | 4/2003 | Farmer et al. | |
| 6,606,861 B2 | 8/2003 | Snyder | |
| 6,684,642 B2 | 2/2004 | Willis et al. | |
| 6,694,900 B2 | 2/2004 | Lissianski et al. | |
| 6,810,673 B2 | 11/2004 | Snyder | |
| 6,823,852 B2 | 11/2004 | Collier, Jr. | |
| 6,865,881 B2 | 3/2005 | Monro, Jr. | |
| 6,953,558 B2 | 10/2005 | Monical | |
| 7,047,748 B2 | 5/2006 | Zauderer | |
| 7,082,753 B2 | 8/2006 | Dalla Betta et al. | |
| 7,146,802 B2 | 12/2006 | Lee | |
| 2002/0104316 A1 | 8/2002 | Dickey et al. | |
| 2003/0200752 A1 | 10/2003 | Moertle et al. | |

* cited by examiner

*Primary Examiner* — Michael Cuff
*Assistant Examiner* — Craig Kim
(74) *Attorney, Agent, or Firm* — William Scott Andes Esq.; Armstrong Teasdale LLP

(57) ABSTRACT

A method and apparatus to facilitate reducing $NO_x$ emissions in turbine engines is provided. The method includes providing an annular shell including a plurality of circumferentially extending panels. The plurality of circumferentially extending panels includes a first panel positioned at an upstream end of the shell and a second panel positioned downstream from, and adjacent to, the first panel. The method also includes forming a plurality of primary dilution holes in the first panel and forming a plurality of secondary dilution holes in the second panel. The dilution holes are configured to discharge dilution air into the shell.

17 Claims, 4 Drawing Sheets

METHOD AND APPARATUS TO FACILITATE REDUCING NO$_x$ EMISSIONS IN TURBINE ENGINES

BACKGROUND OF THE INVENTION

This invention relates generally to gas turbines and, more particularly, to methods and systems that facilitate reducing NO$_x$ emissions from turbine engines.

At least some known combustors used with gas turbine engines produce NO$_x$ emissions as a by-product of the combustion process. Generally, the cause of NO$_x$ emissions may be two-fold. First, higher combustion temperatures generated within the combustor facilitate the production and output of NO$_x$ emissions. Second, an increased residence time, or time required for fuel and air to mix within the combustor also facilitates increased NO$_x$ emissions.

To facilitate reducing combustor temperatures and residence times, at least some known combustors include dilution holes formed in the combustor liner. Specifically, the dilution holes are positioned to discharge dilution air into the combustion chamber to facilitate increasing the rate of mixing of fuel and air within the combustor. Moreover, the dilution air facilitates reducing the combustion temperature while maintaining desired combustion levels.

Generally, because of the positioning and/or orientation of dilution holes within the combustor liner, at least some known combustors which satisfy current emissions standards, as specified by the International Civil Aviation Organization (ICAO) Committee on Aviation Environmental Protection (CAEP), may not meet more stringent standards. For example, at least some known engines that are capable of meeting current CAEP standards (that are effective as of Dec. 31, 2003), may not satisfy future CAEP standards that come into effect after Dec. 31, 2007. Specifically, at least some known engines include dilution holes positioned only at a downstream end of the combustor. However, within such combustors, dilution air does not facilitate residence time reductions and combustion temperature reductions at a forward end of the combustion chamber, where NO$_x$ emissions may be generated.

BRIEF DESCRIPTION OF THE INVENTION

In one aspect, a method for fabricating a combustor liner for a gas turbine engine is provided. The method includes providing an annular shell including a plurality of circumferentially extending panels. The plurality of circumferentially extending panels includes a first panel positioned at an upstream end of the shell and a second panel positioned downstream from, and adjacent to, the first panel. The method also includes forming a plurality of primary dilution holes in the first panel and forming a plurality of secondary dilution holes in the second panel. The dilution holes are configured to discharge dilution air into the shell.

In another aspect, a combustor liner is provided. The combustor liner includes an annular shell including a plurality of circumferentially extending panels. The plurality of circumferentially extending panels includes a first panel positioned at an upstream end of the shell and a second panel positioned downstream from, and adjacent to, the first panel. The combustor liner also includes a plurality of primary dilution holes formed in the first panel, and a plurality of secondary dilution holes formed in the second panel. The dilution holes are configured to discharge dilution air into the shell.

In a further aspect, a gas turbine engine is provided. The gas turbine engine includes a compressor and a combustor comprising a combustor liner that includes an annular shell including a plurality of circumferentially extending panels. The plurality of circumferentially extending panels includes a first panel positioned at an upstream end of the shell and a second panel positioned downstream from, and adjacent to, the first panel. The combustor liner also includes a plurality of primary dilution holes formed in the first panel and a plurality of secondary dilution holes formed in the second panel. The dilution holes are configured to discharge dilution air from the compressor into the combustor. The dilution holes are further configured to facilitate reducing NO$_x$ emissions in the gas turbine engine.

DETAILED DESCRIPTION OF THE INVENTION

Figure 1:
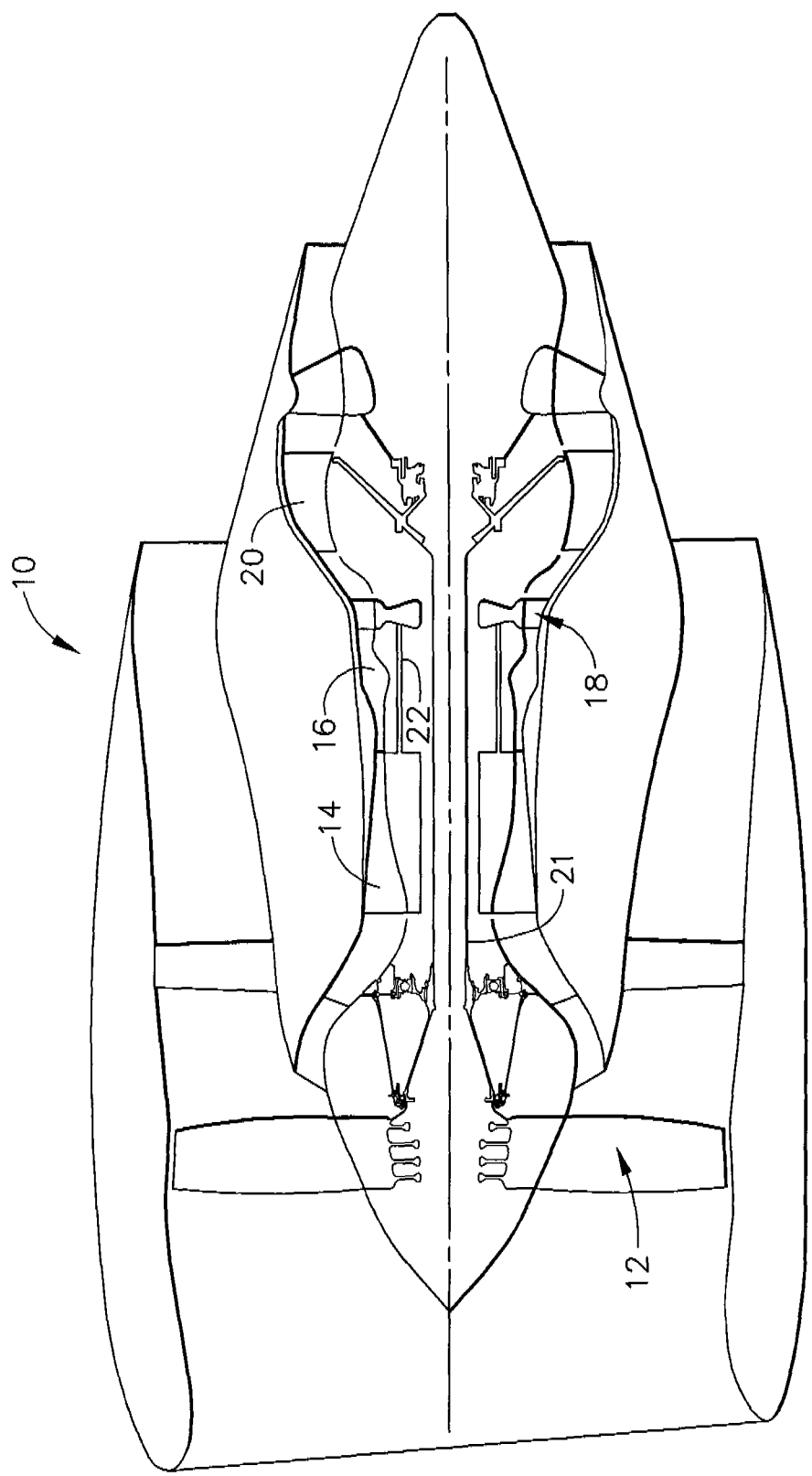
FIG. 1 is a schematic illustration of an exemplary gas turbine engine.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 21, and compressor 14 and turbine 18 are coupled by a second shaft 22. In the exemplary embodiment, gas turbine engine 10 is a CFM56 gas turbine engine or CF34-10 that are available from General Electric Company, Cincinnati, Ohio.

Figure 2:
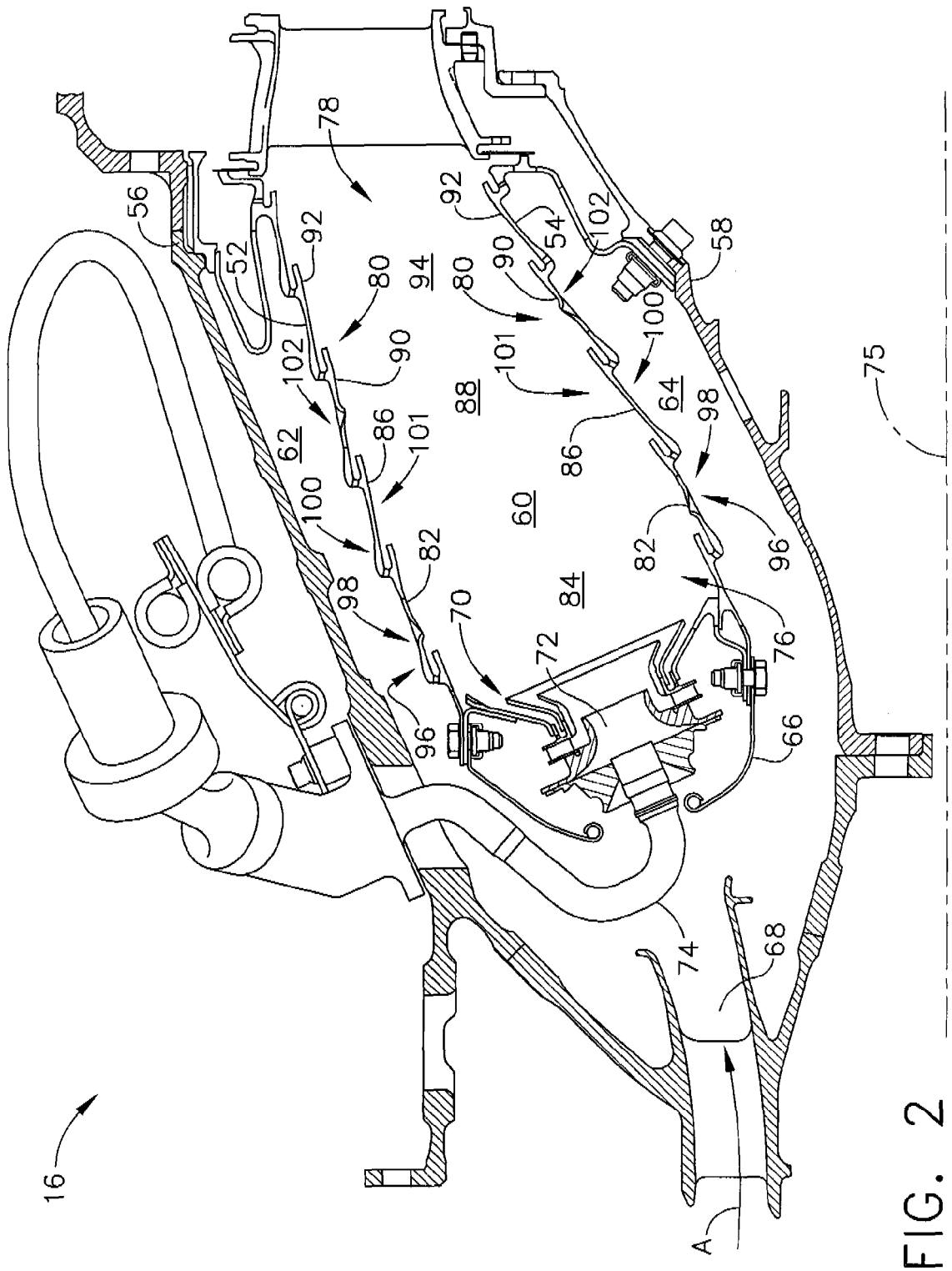
FIG. 2 is a schematic cross-sectional view of an exemplary combustor that may be used with the gas turbine engine shown in FIG. 1.

FIG. 2 is a schematic cross-sectional view of an exemplary combustor 16 that may be used with gas turbine engine 10 (shown in FIG. 1). Combustor 16 includes an outer liner 52 and an inner liner 54 disposed between an outer combustor casing 56 and an inner combustor casing 58. Outer and inner liners 52 and 54 are spaced radially from each other such that a combustion chamber 60 is defined therebetween. Outer liner 52 and outer casing 56 form an outer passage 62 therebetween, and inner liner 54 and inner casing 58 form an inner passage 64 therebetween. A cowl assembly 66 is coupled to the upstream ends of outer and inner liners 52 and 54 respectively. An annular opening 68 leading to an opening formed in cowl assembly 66 enables compressed air to enter combustor 16 in a direction generally indicated by arrow A. The compressed air flows through annular opening 68 to support combustion and to facilitate cooling liners 52 and 54.

An annular dome plate 70 extends between, and is coupled to, outer and inner liners 52 and 54 near their upstream ends. A plurality of circumferentially spaced swirler assemblies 72 are coupled to dome plate 70. Each swirler assembly 72 receives compressed air from opening 68 and fuel from a corresponding fuel tube 74. Fuel and air are swirled and mixed together by swirler assemblies 72, and the resulting fuel/air mixture is discharged into combustion chamber 60. Combustor 16 includes a longitudinal axis 75 which extends from a forward end 76 to an aft end 78 of combustor 16. In the exemplary embodiment, combustor 16 is a single annular combustor. Alternatively, combustor 16 may be any other combustor, including, but not limited to a double annular combustor.

Outer and inner liners 52 and 54 each include a plurality of overlapped panels 80. In the exemplary embodiment, outer liner 52 includes five panels 80 and inner liner 54 includes four panels 80. In an alternative embodiment, both outer and inner liner 52 and 54 may each include any number of panels 80. Panels 80 define combustion chamber 60 within combustor 16. Specifically, in the exemplary embodiment, a pair of first panels 82, positioned upstream, define a primary combustion zone 84, a pair of second panels 86, positioned downstream from first panels 82, define an intermediate combustion zone 88, and a pair of third panels 90, positioned downstream from second panels 86, and a pair of fourth panels 92, positioned downstream from third panels 90, define a downstream dilution combustion zone 94.

Dilution air is introduced primarily into combustor chamber 60 through a plurality of circumferentially spaced dilution holes 96 that extend through each of outer and inner liners 52 and 54. In the exemplary embodiment, dilution holes 96 are each substantially circular. In an alternative embodiment, dilution holes 96 have any shape that facilitates reducing $NO_x$ emissions, as described herein. In the exemplary embodiment, dilution holes 96 are arranged in circumferentially-extending rows defined about the periphery of liners 52 and 54. A forward-most band 98 of dilution holes 96 are referred to as primary dilution holes. In the exemplary embodiment, primary dilution holes 98 defined within first panels 82 are oriented to discharge dilution air into primary combustion zone 84. Also in the exemplary embodiment, a first row of secondary dilution holes 100 formed in a downstream end 101 of second panels 86 are oriented to discharged dilution air into intermediate combustion zone 88.

In the assembled combustor, each primary dilution hole 96 is substantially aligned with each circumferentially-spaced injection point, as defined by a center of each fuel injector 74 and swirler 72. During operation, the flow of combustion gases past the injection points may create "hot streaks" of locally increased material temperatures. Such streaks are not strictly longitudinal; because of the swirl of the flow in the combustor caused by the swirlers 72, but rather the streaks are generally curved in the circumferential direction when viewed along the length of the combustor 16. The orientation of the dilution holes 96, and in particular, because at least one primary dilution hole 98 is substantially aligned with each injection point, facilitates reducing hot streaks and, more particularly, $NO_x$ emissions within combustor 16. Moreover, the placement of secondary dilution holes 100 relative to primary dilution holes 98 also facilitates reducing $NO_x$ emissions. Specifically, primary dilution holes 98 and secondary dilution holes 100 facilitate rapid mixing of fuel and air such that the residence time of combustion is reduced and, as such, combustion temperatures throughout combustor 16 are reduced. As such, $NO_x$ emissions, smoke, and combustor exit temperatures are also facilitated to be reduced. Specifically, primary dilution holes 98 and secondary dilution holes 100 may reduce $NO_x$ emissions by as much as 20-25%. Moreover, dilution holes 98 and secondary dilution holes 100 and 102 facilitate operating the combustor with a substantially linear temperature change in response to increased combustion, such that $NO_x$ emissions are further reduced and a life-span of the turbine engine is facilitated to be increased.

Figure 3:
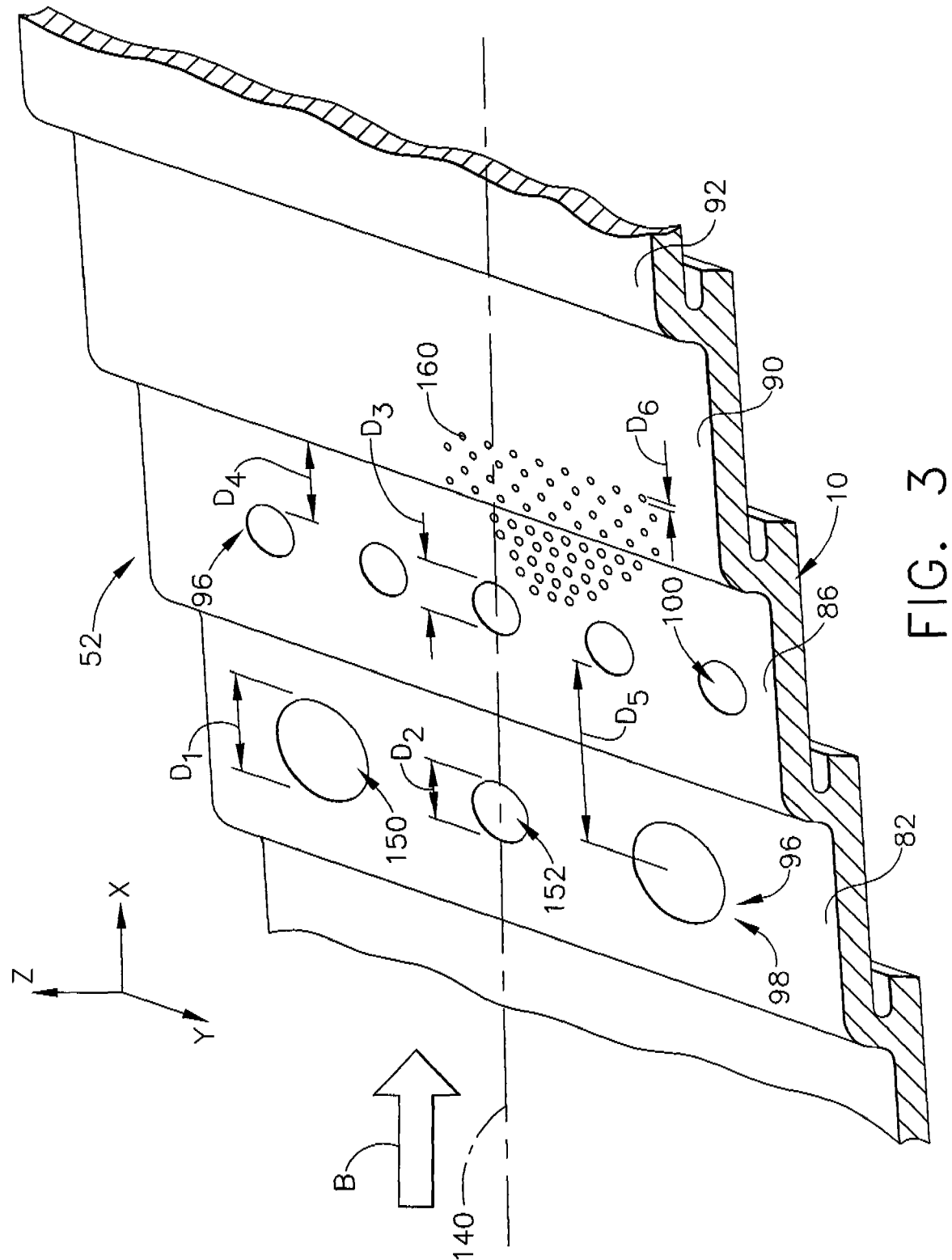
FIG. 3 is a perspective view of an exemplary combustor liner that may be used with the combustor shown in FIG. 2.

FIG. 3 illustrates an exemplary combustor liner that may be used with combustor 16. Specifically, in FIG. 3, the dilution holes 96 that are defined within outer liner 52 are illustrated in more detail. Although FIG. 3 depicts dilution holes 96 in outer liner 52, it should be understood that the configuration of dilution holes 96 of inner liner 54 may be substantially identical to that of outer liner 52. As such, the following description will also apply to inner liner 54. FIG. 3 also includes a frame of reference having axes labeled X, Y and Z, wherein X represents the axial distance extending downstream along the longitudinal axis (indicated by arrow B) of combustor 16, Y represents the circumferential direction, and Z represents a radial direction. In the exemplary embodiment, dilution holes 96 are arranged in a pattern of circumferentially extending rows. More specifically, in the exemplary embodiment, a row of primary dilution holes 98 are formed within first panel 82, and a row of secondary dilution holes 100 are formed within second panel 86. Moreover, in the exemplary embodiment, at least one dilution hole 96 within each row of primary dilution holes 98, and at least one dilution hole 96 within the row of secondary dilution holes 100 is substantially aligned with a longitudinal axis 140 of each swirler 72.

The primary dilution holes 98 include a first group of dilution holes 150 and a second group of dilution holes 152. In the exemplary embodiment, each of the first group of dilution holes 150 has a diameter $D_1$ that is substantially larger than a diameter $D_2$ of each of the second group of dilution holes 152. Moreover, in the exemplary embodiment, each dilution hole 96 within the first group of dilution holes 150 is defined between adjacent dilution holes 96 within the second group of dilution holes 152. In addition, in the exemplary embodiment, the secondary dilution holes 100 include a plurality of evenly spaced dilution holes 96 that each have a diameter $D_3$ that is smaller than both diameters $D_1$ and $D_2$. Furthermore, dilution holes 100 are spaced a distance $D_4$ from third panel 90 and a distance $D_5$ from primary dilution holes 98. In the exemplary embodiment, distance $D_4$ is approximately one-half diameter $D_3$, and distance $D_5$ is equal to approximately two to four times diameter $D_3$.

In the exemplary embodiment, $D_1$ is approximately 0.398±0.005 inches, $D_2$ is approximately 0.312±0.005 inches, and $D_3$ is approximately 0.297±0.005 inches. In an alternative embodiment, each dilution hole 96 is formed with any suitable size that facilitates reducing $NO_x$ emissions. In addition, in an alternative embodiment, each dilution hole 96 is formed in any suitable location or orientation that facilitates achieving reduced $NO_x$ emissions.

Liner 52 also includes a plurality of cooling holes 160 formed in both second panel 86 and third panel 90. Cooling holes 160 facilitate cooling liner 52. In the exemplary embodiment, second panel 86 includes a group of twenty cooling holes 160 that are defined between dilution holes 96, and third panel 90 includes a group of thirty-four cooling holes 160. Although, only one group of cooling holes 160 is illustrated in each of second panel 86 and third panel 90, it should be understood that the groups of cooling holes 160 are spaced circumferentially about second panel 86 and third panel 90. As such, in the exemplary embodiment, second panel 86 includes a total of four hundred cooling holes 160 defined between adjacent dilution holes 96, and third panel 90 includes total of six hundred eighty cooling holes 160 spaced circumferentially about fourth panel 92. Alternatively, second panel 86 and third panel 90 include any number of cooling holes 160 that facilitates cooling of liner 52. Further, in the exemplary embodiment cooling holes 160 have a diameter $D_6$ that is approximately 0.025 inches. In an alternative embodiment, diameter $D_6$ is any size that facilitates cooling of liner 52.

Figure 4:
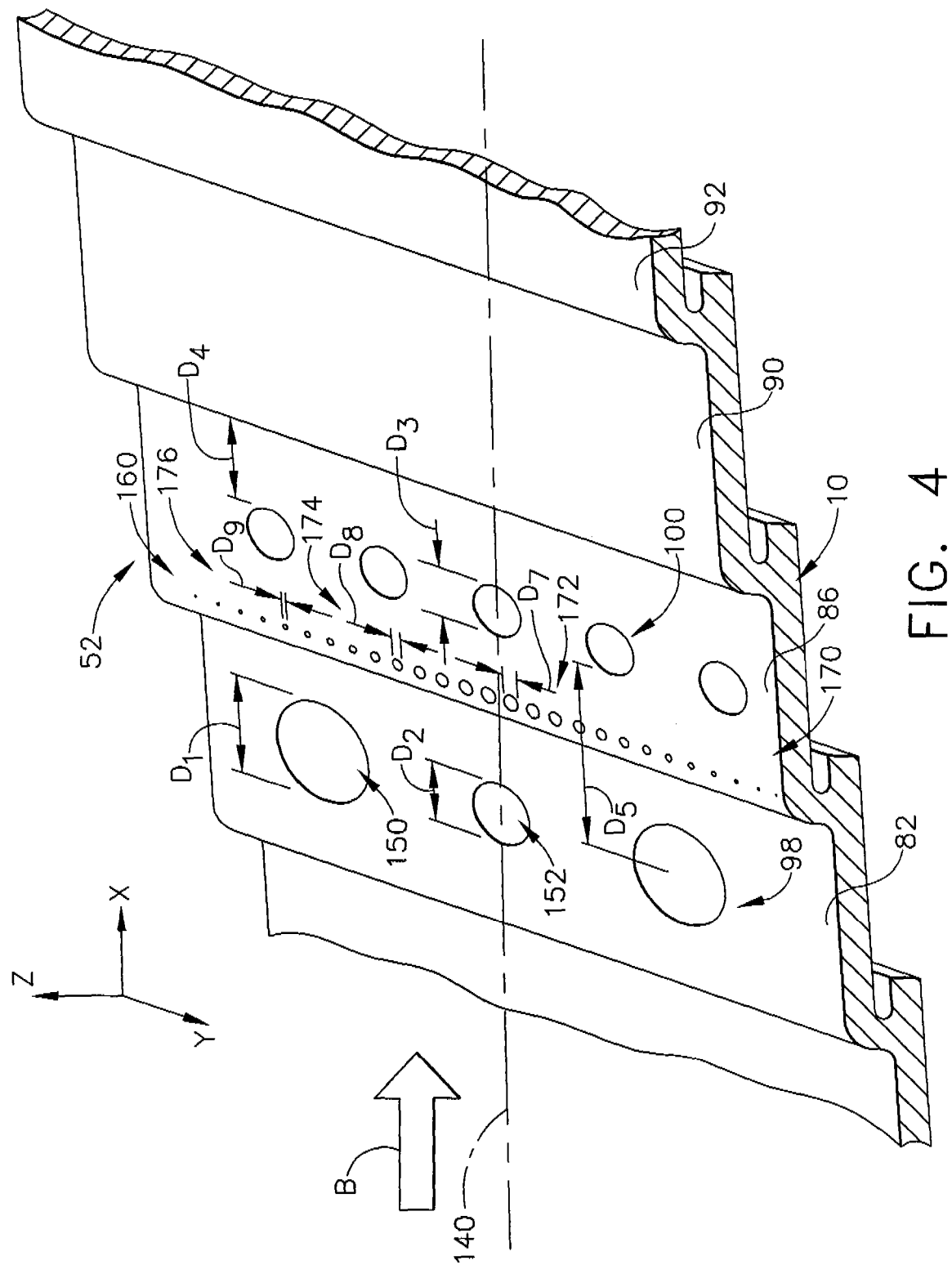
FIG. 4 is a perspective view of an alternate exemplary combustor liner that may be used with the combustor shown in FIG. 2.

FIG. 4 illustrates an alternative embodiment of outer liner 52. Specifically, in FIG. 4, cooling holes 160 are positioned along an upstream edge 170 of second panel 86. Although FIG. 4 depicts cooling holes 160 in outer liner 52, it should be understood that the configuration of cooling holes 160 of inner liner 54 may be substantially identical to that of outer liner 52. As such, the following description will also apply to inner liner 54. In the exemplary embodiment, cooling holes 160 are arranged in three groups. Specifically, each cooling hole 160 of a first group 172 has a diameter $D_7$, each cooling hole 160 of a second group 174 has a diameter $D_8$, and each cooling hole 160 of a third group 176 has a diameter $D_9$. Diameter $D_8$ is greater than diameter $D_9$, and diameter $D_7$ is greater than both diameter $D_8$ and diameter $D_9$. In the exemplary embodiment, second panel 86 includes a plurality of each of first group 172, second group 174, and third group 176. In the exemplary embodiment, each first group 172 is positioned along second panel upstream edge 170 at any location of second panel 86 that experiences hot spots during engine operations, and each third group 176 is positioned along second panel upstream edge 170 at any location of second panel 86 that has a relatively lower temperature in comparison to locations having group 172. In addition, each second group 174 is positioned along second panel upstream edge 170 at any location of second panel 86 that has a relatively an intermediate temperature in comparison to locations having group 172 and group 176.

The above-described primary dilution holes and secondary dilution holes facilitate reducing a residence time of combustion and providing a lower combustion temperature throughout the combustor. As such, $NO_x$ emissions, smoke, and combustor exit temperatures generated within the combustor are facilitated to be reduced. Furthermore, location and orientation of the dilution holes facilitates operation of the combustor with a substantially linear temperature change in response to increased combustion. The linear temperature change of the combustor facilitates reducing $NO_x$ emissions and increasing a life-span of the turbine engine. Specifically, the above-described dilution holes may reduce $NO_x$ emissions by as much as 20-25%, such that the above-described methods and apparatus facilitate engine operation within specified CAEP requirements.

In the exemplary embodiment, a method for fabricating a combustor liner for a gas turbine engine is provided. The method includes providing an annular shell including a plurality of circumferentially extending panels. The plurality of circumferentially extending panels includes a first panel positioned at an upstream end of the shell and a second panel positioned downstream from, and adjacent to, the first panel. The method also includes forming a plurality of primary dilution holes in the first panel and forming a plurality of secondary dilution holes in the second panel. The dilution holes are configured to discharge dilution air into the shell.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the apparatus and methods described herein are described in the context of positioning dilution holes in a combustor liner of a gas turbine engine, it is understood that the apparatus and methods are not limited to gas turbine engines, combustor liners, or dilution holes. Likewise, the gas turbine engine and combustor liner components illustrated are not limited to the specific embodiments described herein, but rather, components of both the gas turbine engine and the combustor liner can be utilized independently and separately from other components described herein.

While the invention has been described in terms of various specific embodiments, those skilled in the art will recognize that the invention can be practiced with modification within the spirit and scope of the claims.

What is claimed is:

1. A method for fabricating a combustor liner for a gas turbine engine, said combustor liner extending from a forward end to and aft end along a centerline of the combustor liner, said method comprising:
   providing an annular shell including a plurality of circumferentially extending panels that overlap adjacent ones of the plurality of panels in an axial direction, wherein the plurality of circumferentially extending panels includes a first panel positioned at an upstream end of the shell and a second panel positioned downstream from, and adjacent to, the first panel;
   forming a plurality of primary dilution holes in the first panel;
   forming a plurality of evenly spaced secondary dilution holes in the second panel, the secondary dilution holes circumferentially offset from the primary dilution holes such that the primary dilution holes and the secondary dilution holes are configured to discharge dilution air into the shell;
   positioning the secondary dilution holes a distance from the primary dilution holes, wherein the distance is whitin a range of twice a diameter of the secondary dilution holes to four times the diameter of the secondary dilution holes.

2. A method in accordance with claim 1 further comprising:
   defining a first group of the primary dilution holes and a second group of the primary dilution holes, wherein each dilution hole of the first group has a diameter that is larger than a diameter of each dilution hole of the second group; and
   arranging each dilution hole of the first group between adjacent dilution holes of the second group.

3. A method in accordance with claim 1 further comprising forming the primary dilution holes with a diameter that is larger than a diameter of the secondary dilution holes.

4. A method in accordance with claim 1 further comprising positioning the secondary dilution holes a distance from a third panel downstream from the second panel, wherein the distance is one half a diameter of the secondary dilution holes.

5. A method in accordance with claim 1 further comprising aligning one of the secondary dilution holes with a swirler configured to discharge a fuel/air mixture into the shell.

6. A method in accordance with claim 1 further comprising orienting the plurality of primary dilution holes and the plurality of secondary dilution holes to facilitate reducing $NO_x$ emissions in the gas turbine engine.

7. A combustor liner comprising:
   an annular shell including a plurality of overlapping circumferentially extending panels, wherein said plurality of circumferentially extending panels includes a first panel positioned at an upstream end of said shell and a second panel positioned downstream from, and adjacent to, said first panel, a downstream portion of the first panel overlaps an upstream portion of the second panel;
   a plurality of primary dilution holes formed in said first panel;
   a plurality of evenly spaced secondary dilution holes formed in said second panel, said secondary dilution holes circumferentially offset from said primary dilution holes such that said primary dilution holes and said secondary dilution holes are configured to discharge dilution air into the shell;

wherein said secondary dilution holes are positioned a distance from said primary dilution holes, the distance within a range of twice a diameter of said secondary dilution holes to four times the diameter of said secondary dilution holes.

8. A combustor liner in accordance with claim 7 wherein said primary dilution holes comprise a first group of primary dilution holes and a second group of primary dilution holes, said first group having a diameter that is larger than a diameter of said second group, each dilution hole of said first group arranged between adjacent dilution holes of said second group.

9. A combustor liner in accordance with claim 7 wherein said primary dilution holes have a diameter that is larger than a diameter of said secondary dilution holes.

10. A combustor liner in accordance with claim 7 wherein said secondary dilution holes are positioned a distance from a third panel downstream from said second panel, wherein the distance is one half a diameter of said secondary dilution holes.

11. A combustor liner in accordance with claim 7 wherein one of said secondary dilution holes is aligned with a swirler configured to discharge a fuel/air mixture into said shell.

12. A combustor liner in accordance with claim 7 wherein said primary dilution holes and said secondary dilution holes facilitate reducing $NO_x$ emissions in a gas turbine engine.

13. A gas turbine engine comprising:

a compressor; and a combustor comprising a combustor liner comprising:

an annular shell including a plurality of overlapping circumferentially extending panels, wherein said plurality of circumferentially extending panels includes a first panel positioned at an upstream end of said shell and a second panel positioned downstream from, and adjacent to, said first panel, a downstream portion of the first panel overlaps an upstream portion of the second panel;

a plurality of primary dilution holes formed in said first panel;

a plurality of evenly spaced secondary dilution holes formed in said second panel, said secondary dilution holes circumferentially offset from said primary dilution holes such that said secondary dilution holes are configured to discharge dilution air from said compressor into said combustor, said primary dilution holes and said secondary dilution holes further configured to facilitate reducing $NO_x$ emissions in said gas turbine engine;

wherein said secondary dilution holes are positioned a distance from said primary dilution holes, the distance within a range of twice a diameter of said secondary dilution holes to four times the diameter of said secondary dilution holes.

14. A gas turbine engine in accordance with claim 13 wherein said primary dilution holes comprise a first group of primary dilution holes and a second group of primary dilution holes, said first group having a diameter that is larger than a diameter of said second group, each dilution hole of said first group arranged between adjacent dilution holes of said second group.

15. A gas turbine engine in accordance with claim 13 wherein said primary dilution holes have a diameter that is larger than a diameter of said secondary dilution holes.

16. A gas turbine engine in accordance with claim 13 wherein said secondary dilution holes are positioned a distance from a third panel downstream from said second panel, wherein the distance is one half a diameter of said secondary dilution holes.

17. A gas turbine engine in accordance with claim 13 wherein one of said secondary dilution holes is aligned with a swirler configured to discharge a fuel/air mixture into said shell.

* * * * *